United States Patent
Parenti et al.

(10) Patent No.: US 10,730,482 B1
(45) Date of Patent: Aug. 4, 2020

(54) VEHICULAR BIOMETRIC SYSTEM WITH AUTOMATICALLY RENEWED SUNSET PERIODS FOR DATA RETENTION

(71) Applicant: FORD GLOBAL TECHNOLOGIES, LLC, Dearborn, MI (US)

(72) Inventors: Robert Parenti, Dearborn, MI (US); Adil Nizam Siddiqui, Farmington Hills, MI (US); Mahmoud Y. Ghannam, Canton, MI (US)

(73) Assignee: FORD GLOBAL TECHNOLOGIES, Dearborn, MI (US)

(*) Notice: Subject to any disclaimer, the term of this patent is extended or adjusted under 35 U.S.C. 154(b) by 0 days.

(21) Appl. No.: 16/378,963

(22) Filed: Apr. 9, 2019

(51) Int. Cl.
  *G05B 19/00* (2006.01)
  *B60R 25/25* (2013.01)
  *G06K 9/00* (2006.01)
  *G07C 9/00* (2020.01)

(52) U.S. Cl.
  CPC .......... *B60R 25/25* (2013.01); *G06K 9/00926* (2013.01); *G07C 9/00563* (2013.01); *G06K 2009/00953* (2013.01)

(58) Field of Classification Search
  None
  See application file for complete search history.

(56) References Cited

U.S. PATENT DOCUMENTS

| | | |
|---|---|---|
| 6,992,562 B2 | 1/2006 | Fuks et al. |
| 8,937,528 B2 | 1/2015 | Protopapas |
| 9,275,208 B2 | 3/2016 | Protopapas |
| 9,381,890 B2 | 7/2016 | Lee et al. |
| 9,563,998 B2 | 2/2017 | Hoyos et al. |
| 9,749,317 B2 | 8/2017 | Cartaya |
| 2010/0097178 A1* | 4/2010 | Pisz ............ H04L 63/0861 340/5.72 |
| 2010/0148923 A1 | 6/2010 | Takizawa |
| 2011/0112768 A1 | 5/2011 | Doyle |
| 2014/0002237 A1* | 1/2014 | Infante ............ B60R 25/252 340/5.32 |
| 2014/0303899 A1* | 10/2014 | Fung ............ G07C 9/37 702/19 |

(Continued)

FOREIGN PATENT DOCUMENTS

WO    2017157629 A1    9/2017

*Primary Examiner* — Adolf Dsouza
(74) *Attorney, Agent, or Firm* — Frank L. Lollo; MacMillan, Sobanski & Todd, LLC

(57) ABSTRACT

Biometric data profiles for users of a vehicle are managed according to an enrollment mode and a maintenance mode. The enrollment mode includes 1) authenticating a respective authorized user, 2) transferring a respective biometric profile to an encrypted biometric memory, 3) specifying a sunset time for automatic deletion of the respective biometric profile, 4) establishing an activity window, and 5) establishing a deferral period. The maintenance mode includes 1) deleting a respective biometric profile upon occurrence of the respective specified sunset time, 2) detecting vehicle access in response to a stored biometric profile during a respective activity window of the respective authorized user, and 3) automatically extending the respective sunset time according to the respective deferral period if the detected vehicle access during the respective activity window meets a respective threshold.

20 Claims, 4 Drawing Sheets

(56) References Cited

U.S. PATENT DOCUMENTS

| | | | |
|---|---|---|---|
| 2015/0363986 A1* | 12/2015 | Hoyos | H05K 999/99 340/5.61 |
| 2017/0357980 A1* | 12/2017 | Bakun | G06Q 20/40145 |
| 2018/0201225 A1* | 7/2018 | Farges | H04W 12/0609 |
| 2019/0066424 A1 | 2/2019 | Hassani et al. | |

* cited by examiner

| User (i) | Profile (i) | Sunset (i) | Window (i) | Access (i) | Span (i) |
|---|---|---|---|---|---|
| ⋮ | ⋮ | ⋮ | ⋮ | ⋮ | ⋮ |
| ⋮ | ⋮ | ⋮ | ⋮ | ⋮ | ⋮ |

VEHICULAR BIOMETRIC SYSTEM WITH AUTOMATICALLY RENEWED SUNSET PERIODS FOR DATA RETENTION

CROSS REFERENCE TO RELATED APPLICATIONS

Not Applicable.

STATEMENT REGARDING FEDERALLY SPONSORED RESEARCH

Not Applicable.

BACKGROUND OF THE INVENTION

The present invention relates in general to automotive vehicle security/access systems, and, more specifically, to a biometric-controlled vehicle system protecting users biometric data by removal from memory after predefined sunset periods.

Vehicle security systems limit access into a vehicle and restrict vehicle operation to an owner and other authorized users while maintaining user convenience and simplicity. Traditional mechanical keys for door locks and ignition locks have generally been replaced by electronic (e.g., wireless) keys and fobs, keypads, keycards, and smartphones as access control devices. Personalization of various vehicle attributes and features can be implemented based on recognition of individual users as a result of unique identifiers provided by their respective access control devices.

In one such system, a vehicle is equipped with a push-to-start (PTS) button, which generates vehicle ignition signals that are recognized as valid if the user carries a recognized wireless fob. To correctly match personalization features to the intended users, any particular fob needs to always be in the possession of the proper user. However, fobs could be easily mixed up in a household. Moreover, the number of separately recognizable users is limited by the number of physical fobs purchased and programmed to the vehicle, requiring additional user expense if more than an initial number of fobs is desired (e.g., for an increased number of drivers). Consequently, biometric scanning techniques have been introduced to provide greater capacity in differentiating unique individuals and for providing greater security with a high level of convenience. For example, U.S. Pat. No. 9,381,890 discloses a biometric fingerprint scanner that can be integrated into the PTS button.

Biometric data that can be used in connection with vehicle access and user identification include image data, voice data, fingerprint data, and many other types of data that can be detected within a vehicle environment. A typical biometric access and personalization system and associated administration of users' biometric information is disclosed in U.S. Pat. No. 9,275,208, which is incorporated by reference in its entirety.

For storage on a vehicle, the biometric data of users is often encrypted and otherwise secured against copying or misuse. In particular, collection and storage of biometric data should conform to established standards for protecting personally identifiable information (PII). Even though encrypted storage on the vehicle can be robust, data protection remains a concern in view of the long lifecycle of a typical vehicle and the likelihood of vehicle possession/ownership changing during that lifecycle. Therefore, provision is made in U.S. Pat. No. 9,275,208 for deleting a user's biometric data on demand. It is also known to specify a fixed deletion date in advance when biometric data is first recorded for a user.

For example, a vehicle may often be acquired by lease. The primary lessee/user can enroll themselves and others to use biometric features by storing their corresponding biometric data. The lessee/user(s) could specify a sunset time for the data to correspond with the end of the lease period. The biometric data would expire (and be deleted) once the sunset duration is reached regardless of whether the vehicle is stolen, transferred, or the lease has expired.

In another example, a vehicle can be hired out by a rental company using biometric-based features to avoid having to surrender a physical key or other forms of vehicle authorization. Based on a duration of the rental, the renter can set a validity period (e.g., a time duration or distance) of a biometric key. The rentee would enroll into the rental vehicle, and could be given the option of increasing the validity period for further compensation. If not automatically deleted at the termination of the authorized usage, the renting company will manually erase the rentee's biometric data at vehicle check-in.

While automatic deletion of biometric data is desirable to help protect the personally identifiable information, it is often not so easy to anticipate the length of time for the active use of a vehicle by a particular user. Making a conservative choice by choosing a shorter duration for the sunset time to delete the biometric data provides better security but causes inconvenience when the data is prematurely expired before the user has completed their use of the vehicle. Therefore, an improved system of automatically deleting biometric data is needed.

SUMMARY OF THE INVENTION

In one aspect of the invention, a vehicle manages biometric data using a biometric sensor configured to capture biometric data samples. A biometric memory is configured to store biometric profiles of authorized users of the vehicle. A biometric processor provides vehicle access according to detecting matches between captured biometric samples of a user attempting the vehicle access and the stored biometric profiles of authorized users, and the biometric processor is further configured to provide an enrollment mode and a maintenance mode. The enrollment mode includes 1) authenticating a respective authorized user, 2) transferring a respective biometric profile of the authorized user to the biometric memory, 3) specifying a sunset time for automatic deletion of the respective biometric profile, 4) establishing an activity window, and 5) establishing a deferral period. The maintenance mode includes 1) deleting a respective biometric profile upon occurrence of the respective specified sunset time, 2) detecting vehicle access in response to a stored biometric profile during a respective activity window of the respective authorized user, and 3) automatically extending the respective sunset time according to the respective deferral period if the detected vehicle access during the respective activity window meets a respective threshold.

DETAILED DESCRIPTION OF PREFERRED EMBODIMENTS

In preferred embodiments, a host vehicle is equipped with the appropriate hardware and software to enable biometric based features. Biometric data is collected, encrypted, and saved on a stand-alone vehicle module to prevent unauthorized access. Enrollment preferably uses multi-factor authentication to prevent/manage unauthorized enrollments. The biometric software and hardware used to collect biometric data are robust against spoofing or hacking. A host vehicle may be able to connect to cellular or WiFi networks in order to allow the remote access management or removal of biometric data. The host vehicle preferably provides a user interface that allows the vehicle owner to select the sunset period that biometric data is stored within the vehicle.

One particular owner/custodian of the vehicle can be given administrative rights to set an expiration period (sunset time) for all stored PII data on the vehicle, or the individual users can be given the option. The owner and individual users may be allowed to modify the sunset time or immediately delete PII data through a mobile application or using an on-board human-machine interface (HMI).

In addition, the invention provides automatic renewal (extension) of sunset times based on successful vehicle access by the respective user as the sunset time is approaching. Thus, when driving the vehicle and after being positively identified by the biometric sensor(s), the possibility of extending the current sunset time can be considered according to conditions that may be pre-set or customized by the user or administrator, for example. The automatic extension feature may utilize an "activity window" for which the duration can be selected by a user or set by default. The activity window can be anchored to the respective sunset time (e.g., a 24 hour period before the expiration) in a fixed position. Alternatively, the activity window can be a sliding window ending at the present moment with a selected duration prior to the present (e.g., the preceding 48 hours). Both kinds of windows could be used together.

The automatic extension may take into consideration the level of vehicle access (i.e., number of successful biometric authentications of the particular user) and compare to a threshold to determine whether to automatically extend the sunset time. The time span to be applied when creating the automatic extension can also be customized by the user during enrollment. It could be added to the existing sunset time or added to the present moment, for example.

Figures 1, 2:
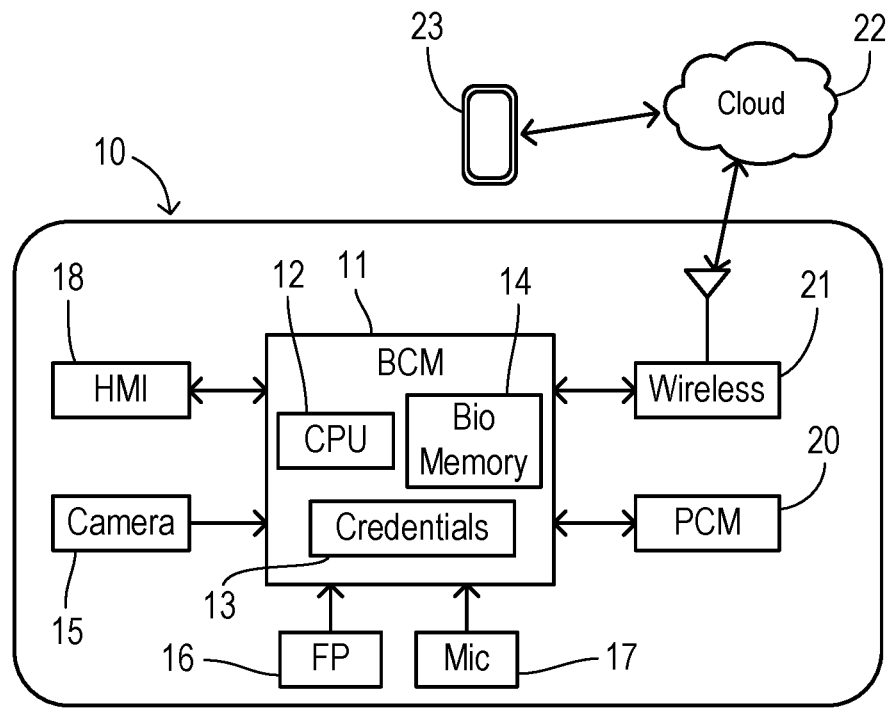
FIG. 1 is a block diagram of a vehicle with biometric data management according to one embodiment of the invention.
FIG. 2 is a data table for managing biometric data profiles according to one embodiment of the invention.

Referring to FIG. 1, a vehicle 10 includes a body control module (BCM) 11 having a central processor 12, a database 13 for security credentials, and a secure biometric memory 14. Body control module 11 is configured to function, among other things, as a biometric processor. However, the biometric processing functions as described herein can be distributed among one or more different electronic modules in vehicle 10.

Biometric sensors provided in vehicle 10 to capture biometric data samples include a camera 15, a fingerprint scanner 16, and a microphone 17, each of which is coupled directly or indirectly with BCM 11. A human machine interface (HMI) 18 is coupled to module 11 for receiving user input selections during an enrollment mode and a maintenance mode, and for displaying command and control information from the biometric processor functions to a user/administrator in vehicle 10.

Based upon an authenticated identity of a user, BCM 11 interacts with various vehicle components and systems (such as a powertrain control module 20) to grant vehicle access and to customize vehicle operation for the user. A wireless transceiver 21 is coupled to module 11 in order to communicate with an offboard data processing system in a cloud network 22, e.g., for managing security credentials and for managing a biometric profile database in memory 14. A smartphone 23 or other portable wireless device can include a user app in order to execute a remote interface for user management such as manually deleting biometric data, for example.

Within BCM 11, the processor may utilize a lookup table 25 as shown in FIG. 2 to manage authorized users. For each identified user, table 25 may specify an address within biometric memory where a respective user's biometric profile is stored as well as various selectable parameters associated with automatic deletion (sunset) and automatic renewal. More specifically, table 25 includes a plurality of rows with each row corresponding with a respective user. A first column identifies a user, and a second column provides an address within the biometric memory containing the respective biometric data profile for the user. A third column contains the selected sunset time which may be as specified during original enrollment or may be an updated (i.e., extended) value. In a fourth column, a respective activity window is specified including a window duration and a window type (e.g., a fixed window anchored to the sunset time or a sliding window). In a fifth column, a renewal threshold to be met when granting an automatic extension is stored as a selected number of vehicle accesses to be required. In the last column, a user selected time span for extending a respective sunset time is stored.

Figure 3:
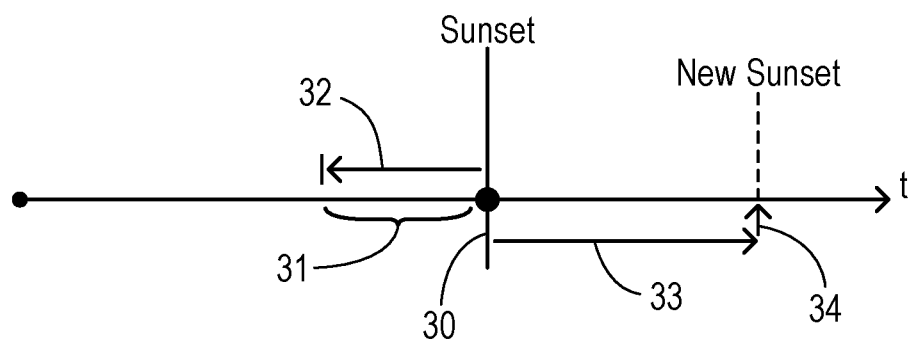
FIG. 3 is a timeline showing one embodiment of an activity window and a sunset extension.
Figure 4:
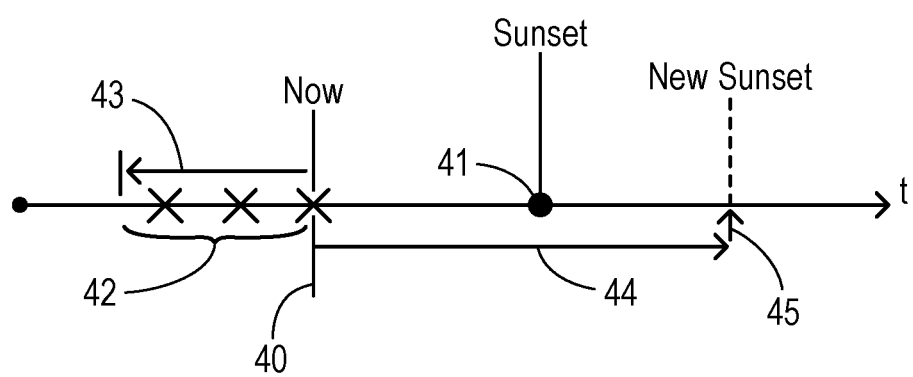
FIG. 4 is a timeline showing another embodiment of an activity window and a sunset extension.

FIGS. 3 and 4 are timelines showing fixed and sliding activity windows, respectively, and their relationship with added time spans to extend a sunset time. FIG. 3 shows one preferred arrangement for a fixed activity window wherein a sunset time 30 is set for a future time as determined during the enrollment mode. An activity window 31 precedes sunset times 30 by a duration 32 which is also selected during enrollment. When the current clock time falls within activity window 31, the invention accumulates a count of the authorized vehicle accesses by the respective user to determine whether the vehicle access reaches a respective threshold (likewise selectable during enrollment). Preferably, the respective threshold may be comprised of one single vehicle access, which can be provided as a default value during enrollment. When the threshold access activity is satisfied during activity window 31, then a time span 33 (e.g., a selected number of days) is added to sunset time 30 in order to generate a new sunset time 34. A new activity window is then established ending at the new sunset time 34.

FIG. 4 shows one preferred arrangement for a sliding activity window wherein a sunset time 41 is set for a future time following a present time 40 as determined during the enrollment mode. An activity window 42 has a selected duration 43 preceding present time 40. The times of previous vehicle access by the same user are recorded so that the invention can determine a count of the authorized vehicle accesses during activity window 42 by the respective user (including the current access). The number of vehicle accesses is compared to a respective threshold having a value of two or more (likewise selectable during enrollment). When the threshold access activity is satisfied during activity window 42, then a time span 44 (e.g., a selected number of days) is added to present time 40 in order to generate a new sunset time 45 and old sunset time 41 is deleted. Thus, after a period of sufficiently active use of the vehicle, the sunset time is automatically pushed out to the future by the selected time span.

Figure 5:
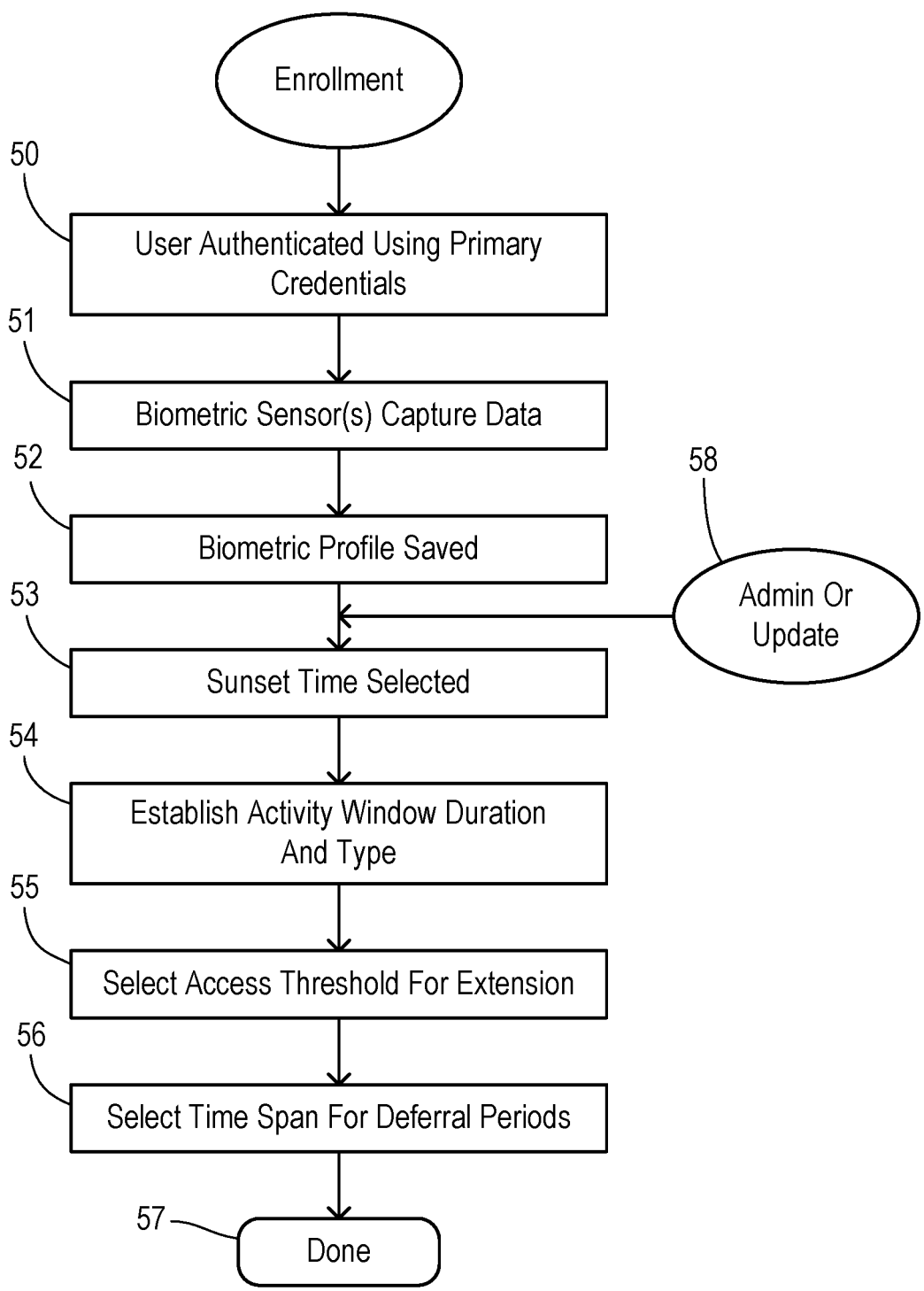
FIG. 5 is a flowchart showing one embodiment of an enrollment mode of the invention.

FIG. 5 shows a preferred method for the enrollment mode which is manually entered by a particular user. First, the user must be authenticated in step 50 using primary credentials such as an electronic key or entry of a PIN number, for example. Once the user is authenticated and identified, biometric sensors capture biometric data samples of the user in step 51. The biometric data samples are compiled as a biometric profile according to known methods, and the biometric profile is saved in step 52.

A user selects a sunset time in step 53, typically by specifying a future date and time of day. In step 54, an activity window duration and type are established. This can be comprised of a default window duration and type (e.g., specified by an administrative user) or can be selected by the individual user by entering their input selections via the HMI (e.g., a touchscreen control panel). For example, the duration may be a number of hours or days and may be anchored as a fixed activity window to the selected sunset time. In step 55, an access threshold may be selected. In step 56, a time span is selected to be used for generating a deferral period when automatically extending a sunset time. The enrollment mode is exited at step 57.

At any time after initial enrollment of a biometric profile, the user or an administrator could update the sunset time, activity window, time spent, or other details of a biometric enrollment by entering the enrollment mode at step 58. In addition, an administrator or the user could alternatively choose to delete a biometric profile at any given time.

Figure 6:
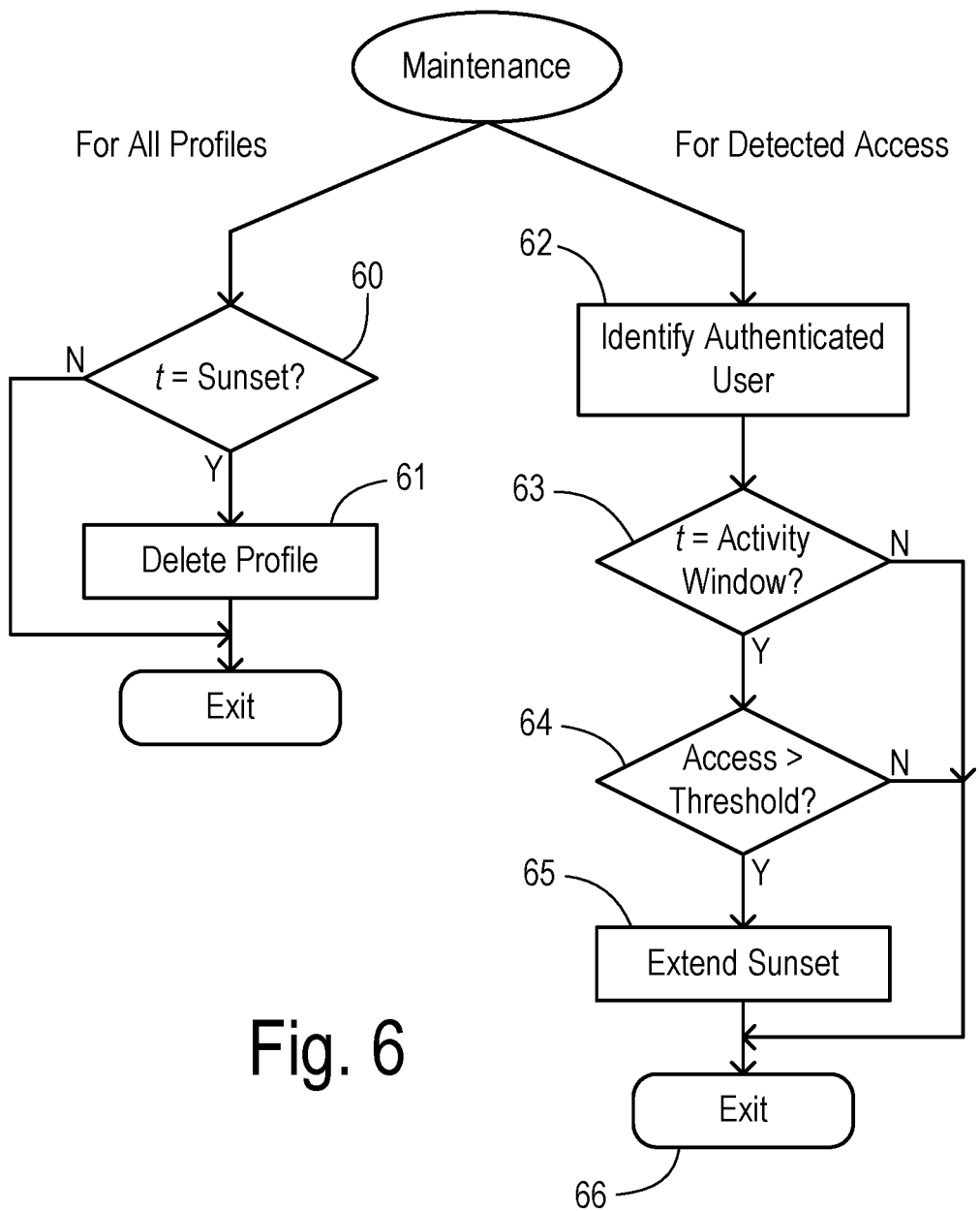
FIG. 6 is a flowchart showing one embodiment of a maintenance mode of the invention.

Using the sunset time and associated automatic extension parameters as set up during the enrollment, the biometric processor provides a maintenance mode during normal vehicle operation as shown in FIG. 6. During each particular vehicle drive cycle, the maintenance mode performs a review of the sunset times for all stored biometric profiles. Thus, the current time is compared in step 60 to each of the sunset times. If the current time is equal to any particular sunset time, then the corresponding biometric profile is deleted in step 61. Otherwise, the maintenance mode is exited.

Also during the maintenance mode, the potential for automatically extending a sunset time is reviewed for each detected access corresponding to a user with a biometric profile. The user is identified according to their authentication in step 62. In step 63, the current time as compared to the activity window for the identified user. If the time does not fall within the activity window then the maintenance mode is exited at step 66. If the current time falls within the corresponding activity window, then a check is performed in step 64 to determine whether the vehicle access activity is greater than the access threshold. If not, then maintenance mode is exited. Otherwise, the sunset time is extended in step 65 according to the saved parameters before exiting in step 66.

What is claimed is:

1. A vehicle comprising:
a biometric sensor configured to capture biometric data samples;
a biometric memory configured to store biometric profiles of authorized users of the vehicle; and
a biometric processor providing vehicle access according to detecting matches between captured biometric samples of a user attempting the vehicle access and the stored biometric profiles of authorized users, wherein the biometric processor is further configured to provide an enrollment mode and a maintenance mode;
wherein the enrollment mode includes 1) authenticating a respective authorized user, 2) transferring a respective biometric profile of the authorized user to the biometric memory, 3) specifying a sunset time for automatic deletion of the respective biometric profile, 4) establishing an activity window, and 5) establishing a deferral period; and
wherein the maintenance mode includes 1) deleting a respective biometric profile upon occurrence of the respective specified sunset time, 2) detecting vehicle access in response to a stored biometric profile during a respective activity window of the respective authorized user, and 3) automatically extending the respective sunset time according to the respective deferral period if the detected vehicle access during the respective activity window meets a respective threshold.

2. The vehicle of claim 1 further comprising:
a user interface coupled to the biometric processor configured to receive user input selections from the authorized user in the vehicle;
wherein the enrollment mode includes selecting a duration for the activity window in response to the user input selections.

3. The vehicle of claim 2 wherein the enrollment mode includes selecting between a fixed activity window or a sliding activity window in response to the user input selections.

4. The vehicle of claim 2 wherein the activity window has a fixed endpoint concurrent with the respective sunset time.

5. The vehicle of claim 1 wherein the respective threshold is comprised of a single detected access.

6. The vehicle of claim 1 further comprising:
a user interface coupled to the biometric processor configured to receive user input selections from the authorized user in the vehicle;
wherein the enrollment mode includes selecting a number of vehicle accesses to be used as the respective threshold in response to the user input selections.

7. The vehicle of claim 1 further comprising:
a user interface coupled to the biometric processor configured to receive user input selections from the authorized user in the vehicle;
wherein the enrollment mode includes selecting a time span for the deferral period in response to the user input selections.

8. The vehicle of claim 7 wherein the enrollment mode includes selecting, in response to the user input selections, whether the selected time span is added to a current value of the respective sunset time or is added to the current time.

9. The vehicle of claim 1 wherein the maintenance mode further includes immediate deletion of a respective biometric profile in response to an authorized command.

10. The vehicle of claim 1 wherein the maintenance mode further includes manual modification of a respective sunset time specified for a respective biometric profile in response to an authorized command.

11. A method for managing sunset times for stored biometric profiles of users of a vehicle, comprising the steps of:
in an enrollment mode, 1) authenticating a respective authorized user using nonbiometric credentials, 2) collecting a biometric profile of the respective authorized user from a biometric sensor, 3) transferring the biometric profile of the authorized user to an encrypted biometric memory, 4) the authorized user specifying a sunset time for automatic deletion of the respective biometric profile, 5) establishing an activity window, and 6) establishing a deferral period; and in a maintenance mode, 1) deleting a respective biometric profile upon occurrence of the respective specified sunset time, 2) detecting vehicle access in response to a stored biometric profile during a respective activity window of the respective authorized user, and 3) automatically extending the respective sunset time according to the respective deferral period if the detected vehicle access during the respective activity window meets a respective threshold.

12. The method of claim 11 further comprising a step, during the enrollment mode, of selecting a duration for the activity window in response to user input selections entered with a user interface.

13. The method of claim 12 further comprising a step, during the enrollment mode, of selecting between a fixed activity window or a sliding activity window in response to the user input selections.

14. The method of claim 12 wherein the activity window has a fixed endpoint concurrent with the respective sunset time.

15. The method of claim 11 wherein the respective threshold is comprised of a single detected access.

16. The method of claim 11 further comprising a step, during the enrollment mode, of selecting a number of vehicle accesses to be used as the respective threshold in response to user input selections entered with a user interface.

17. The method of claim 11 further comprising a step, during the enrollment mode, of selecting a time span for the deferral period in response to user input selections entered with a user interface.

18. The method of claim 17 further comprising a step, during the enrollment mode, of selecting whether the selected time span is added to a current value of the respective sunset time or is added to the current time.

19. The method of claim 11 wherein the maintenance mode further comprises a step of immediately deleting a respective biometric profile in response to an authorized command.

20. The method of claim 11 wherein the maintenance mode further comprises a step of manually modifying a respective sunset time specified for a respective biometric profile in response to an authorized command.

* * * * *